United States Patent [19]

Haferl

[11] Patent Number: 4,780,648
[45] Date of Patent: Oct. 25, 1988

[54] DEFLECTION APPARATUS

[75] Inventor: Peter E. Haferl, Adliswil, Switzerland

[73] Assignee: RCA Licensing Corporation, Princeton, N.J.

[21] Appl. No.: 102,446

[22] Filed: Sep. 29, 1987

[30] Foreign Application Priority Data

Nov. 4, 1986 [GB] United Kingdom ................ 8626317

[51] Int. Cl.[4] .............................................. H01J 29/56
[52] U.S. Cl. .................... 315/371; 315/370; 315/408; 315/410; 315/411
[58] Field of Search ............... 315/371, 370, 408, 410, 315/411

[56] References Cited

U.S. PATENT DOCUMENTS

| 4,144,479 | 3/1979 | Farina et al. | 315/408 |
|---|---|---|---|
| 4,429,257 | 1/1984 | Haferl | 315/371 |
| 4,468,593 | 8/1984 | Haferl | 315/371 |
| 4,516,058 | 5/1985 | Haferl | 315/370 |
| 4,572,993 | 2/1986 | Haferl | 315/408 |
| 4,625,154 | 11/1986 | Willis | 315/371 |
| 4,634,937 | 1/1987 | Haferl | 315/371 |
| 4,634,938 | 1/1987 | Haferl | 315/371 |
| 4,686,430 | 8/1987 | Jennings, Jr. | 315/371 |
| 4,687,972 | 8/1987 | Haferl | 315/371 |
| 4,719,392 | 1/1988 | Haferl | 315/371 |

OTHER PUBLICATIONS

Technical Publication 201 Published by Phillips Co., Dated Apr. 10, 1986.
U.S. patent application No. 875,708 filed 6/18/86, entitled Raster Correction Circuit, in the name of P. E. Haferl.
U.S. patent application No. 102,584 entitled, Raster Distortion Correction for a Deflection Circuit, in the name of P. E. Haferl.

Primary Examiner—Theodore M. Blum
Assistant Examiner—David Cain
Attorney, Agent, or Firm—Eugene M. Whitacre; Joseph J. Laks; Sammy S. Henig

[57] ABSTRACT

In a deflection apparatus which corrects for inside pincushion distortion, a deflection winding and a retrace capacitance form a retrace circuit during a retrace interval. A trace capacitance forms a trace resonant circuit with the deflection winding during the trace interval. A circuit branch that includes a second capacitance and a modulation inductance is coupled to the trace capacitance during the trace interval to form with the trace capacitance a second resonant circuit having a resonance frequency that is substantially higher during the trace interval than that of the trace resonant circuit. A current in the circuit branch modulates the trace parabolic voltage across the trace capacitance in a manner to reduce inside pincushion distortion. A supply current is coupled to an intermediate terminal of the modulation inductance for reducing "mouseteeth" raster distortions.

14 Claims, 4 Drawing Sheets

UNCORRECTED RECEIVER (E-W CIRCUIT INOPERATIVE)

DEFLECTION APPARATUS

This invention relates to a deflection circuit in which a supply current is coupled to a trace capacitor of the deflection circuit through a plurality of current paths.

Typically, the horizontal deflection circuit encompasses an output stage that includes a horizontal deflection winding and a trace capacitance that supplies deflection current to the deflection winding during each trace interval. A retrace capacitance is coupled across the deflection winding during the retrace interval to form a retrace resonant circuit. Energy is replenished during retrace via a flyback transformer.

The heavy loading of the high beam current in a secondary winding of the flyback transformer, that occurs in the course of displaying, for example, each white horizontal strip of a crosshatch pattern, such as shown in FIG. 4, represents a heavy load to the flyback transformer during retrace. Consequently, the retrace capacitance may be slightly discharged during retrace due to the aforementioned loading. This may result in a discharge current from the trace capacitance into the retrace capacitance through the deflection winding and a slight drop of the voltage across the trace capacitance during the white horizontal strips of the crosshatch pattern. The charge of the trace capacitance is replenished during the retrace intervals associated with the scan lines that display the black picture portion underneath the white crosshatch stripes. This causes a small current in the opposite direction through the deflection winding. The charge and discharge current of the trace capacitance produces a small raster displacement and results in low frequency oscillations modulating the deflection winding trace current. This low frequency modulation may cause each vertical strip of the crosshatch pattern to appear as being of a zig-zag shape, instead of a straight line shape. The zig-zag shape appears in a given vertical strip immediately below the intersection point with a horizontal strip. Such distortions that are sometimes referred to by the name "mouseteeth" distortions are illustrated in the crosshatch pattern of FIG. 4. They appear, during and just after the times in which high beam transients occur, because the deflection circuit that represents a low impedance energy flywheel, supplies the transient increased in energy requirement of the ultor circuits. Thus, energy transferred from the deflection circuit to the ultor circuits may tend to cause variations in the deflection winding trace current.

"Mouseteeth" distortions may be reduced using an arrangement such as described in U.S. Pat. No. 4,634,937, entitled EAST-WEST CORRECTION CIRCUIT in the name of P.E. Haferl, that is referred to herein as the Haferl patent, by supplying an E-W modulation current generated by an east-west control circuit via a choke having a high impedance. This choke integrates the horizontal frequency components resulting in a sink current that is substantially a D.C. current that flows from the deflection circuit to the E-W control circuit. Deflection disturbances referred to as "mouseteeth" are avoided because of the loose coupling between the flyback transformer and the deflection winding during the retrace interval. The loose coupling is provided by the choke that provides high frequency isolation of the deflection circuit output stage from the E-W control circuit.

Color television picture tubes with a faceplate radius R greater than 1, such as, for example, Philips 45AX picture tube in which R is equal to 1.6, may require a significantly high amount of inside pincushion correction.

In accordance with an aspect of the invention, a deflection apparatus includes a deflection winding for generating scanning current at a deflection rate. A trace capacitance is coupled to the deflection winding. A supply inductance is coupled to the trace capacitance to provide a first current path for conducting a first portion of a supply current. A circuit branch, including a second capacitance and a second inductance, that is coupled to the trace capacitance forms with the trace capacitance a second resonant circuit for generating in the second inductance a second current. The second current is coupled to the trace capacitance to vary a parabolic voltage in the trace capacitance in accordance with the amplitude of the second current in a manner to reduce, for example, inside pincushion distortion. A voltage in the second capacitance is combined at a terminal of the second inductance with the parabolic voltage in the trace capacitance to reduce an alternating current voltage at the terminal. A second portion of the supply current is coupled to the trace capacitance through the terminal to reduce a discharge current from the trace capacitor during retrace. Thus, for example, mouseteeth distortions are also reduced.

In a deflection apparatus embodying another aspect of the invention, a scanning current is generated in a deflection winding at a deflection rate during trace and retrace intervals of a deflection cycle. The deflection winding is included in a retrace resonant circuit during the retrace interval. Switching means that is coupled to the deflection winding, responsive to an input signal at a first frequency that is related to the deflection rate, generates, during the retrace interval, a retrace voltage. A trace capacitance coupled to the deflection winding forms with the deflection winding a first trace resonant circuit during the trace interval such that the scanning current in the trace capacitance develops a parabolic voltage in the trace capacitance during the trace interval. A supply voltage is developed at a supply terminal. A supply inductance is coupled between the supply voltage and the trace capacitance for supplying via the supply inductance a first portion of a DC supply current that replenishes a first portion of energy losses in the retrace resonant circuit. A second portion of the DC supply current is coupled to the trace capacitance in a current path that bypasses the supply inductance for replenishing a second portion of the energy losses.

Figure 1:
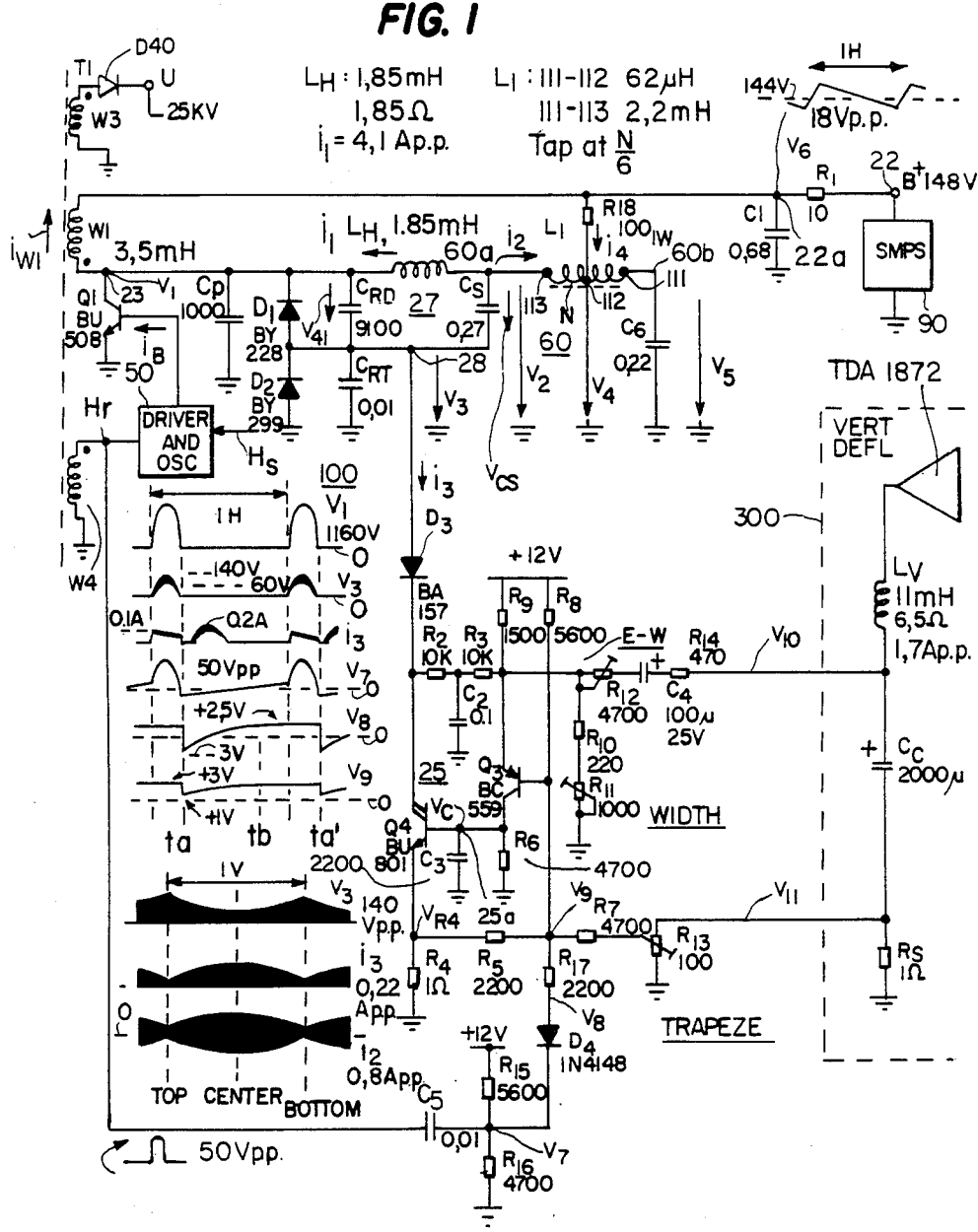
FIG. 1 illustrates a deflection circuit that includes inside pincushion correction arrangement, embodying an aspect of the invention.

A deflection circuit 100 of FIG. 1, embodying an aspect of the invention, may provide horizontal deflection of the electron beams in, for example, a Philips 110° 45AX FS color picture tube type A66-EAK00X01. In FIG. 1, a source of regulated direct current voltage B+, developed between a terminal 22 and ground, is coupled through a small-valued resistor R1 to a terminal 22a of a primary winding W1 of a horizontal flyback transformer T1. The other terminal of winding W1 is coupled to a junction terminal 23. A filtering capacitance Cl is coupled from terminal 22a to ground. Regulated voltage B+ is generated, for example, by a switched mode power supply 90. A secondary winding W3 of transformer T1, supplies an ultor voltage U through a rectifying diode D40.

A horizontal output transistor Q1, operating at a deflection rate $f_H$ and having its base coupled to a conventionally built driver and oscillator circuit 50, has its collector-to-emitter path coupled between junction terminal 23 and ground. Circuit 50 is synchronized by a sync signal $H_s$ and by a retrace pulse representative signal $H_r$, in a well known manner. Paralleling transistor Q1 is the series arrangement of two rectifiers, diodes $D_1$ and $D_2$ operating as a damper diode arrangement. Coupled in parallel with the anode and cathode electrodes of diode $D_1$ is an arrangement of a horizontal deflection winding $L_H$ that is coupled to an S-shaping, or trace, capacitance $C_s$. A deflection retrace capacitance $C_{RD}$, coupled also across the anode and cathode electrodes of diode $D_1$, forms with deflection winding $L_H$, a parallel retrace resonant circuit 27. A second retrace capacitance $C_{RT}$ is coupled between a junction terminal 28 and ground. A small-valued capacitance $C_P$ is coupled between terminal 23 and ground. Capacitance $C_P$ provides fine tuning of the resonance frequency of retrace resonance circuit 27. Coupled between terminal 28 of retrace resonant circuit 27 at the junction between capacitance $C_{RT}$ and capacitance $C_{RD}$, and ground, is a series arrangement of a diode $D_3$ and a controllable East-West current source 25 that includes a current sink transistor Q4 having, at the collector electrode, a high output impedance during retrace. The collector electrode of transistor Q4 is coupled via a diode $D_3$ to terminal 28 to provide a modulated sink current $i_3$ that varies in a vertical rate parabolic manner. Diode $D_3$ decouples the collector of transistor Q4 from ground, toward the end of trace, when diode $D_2$ conducts, to prevent the flow of saturation collector current in transistor Q4, prior to retrace.

An inside pincushion distortion correction circuit 60, embodying an aspect of the invention, includes an inductance L1 that is coupled to a terminal 60a at the junction of capacitance $C_s$ and inductor $L_H$. A capacitor $C_6$ of circuit 60 is coupled between a terminal 60b of inductance L1 and ground.

During the first half of trace, deflection current $i_1$ flows, in a direction opposing the arrow, in deflection winding $L_H$ and in diode $D_1$. During the second half of trace, deflection current $i_1$ flows in deflection winding $L_H$, in the direction of the arrow, and in diode $D_2$ and transistor Q1 that is conductive. At the end of trace, transistor Q1 becomes nonconductive and a retrace voltage $V_1$ is developed between terminal 23 and ground.

During the retrace interval, charge is taken away from retrace capacitance $C_{RT}$ by East-West modulated sink current $i_3$ that flows via diode $D_3$. The higher the integral $\int i_3 dt$, over the entire retrace interval, for example, the larger becomes a retrace voltage V41 across capacitance $C_{RD}$ and the smaller becomes a modulated voltage $V_3$ across capacitance $C_{RT}$. The peak of deflection current $i_1$ through deflection winding $L_H$, during the trace interval, is directly related to the peak of retrace voltage V41 across capacitance $C_{RD}$ at the center of the retrace interval. By modulating current $i_3$ of transistor Q4 at a vertical rate, switched current source 25 provides outside pincushion correction to horizontal scanning current $i_1$.

The high output impedance of transistor Q4 that is interposed between winding W1 and retrace resonant circuit 27 prevents, during horizontal retrace, an undesirable high frequency coupling through current source 25 between winding W1 of flyback transformer T1 and retrace resonant circuit 27 that, otherwise, could have caused "mouseteeth" distortion.

"Mouseteeth" distortion can also be reduced by supplying East-West modulated current, instead of through the high output impedance of the transistor, via a choke having a high impedance. The choke, however, disadvantageously, may be expensive. An example of such arrangement is described in, the Haferl patent that was mentioned before.

Capacitor $C_{RT}$ is coupled to winding W1 via ground and capacitor $C_1$ to form a second retrace resonant circuit that is coupled to retrace resonant circuit 27 so as to form a combined retrace resonant circuit that includes winding W1, capacitor $C_{RT}$ and retrace resonant circuit 27. The combined retrace resonant circuit is tuned to, for example, the retrace frequency. In order to tune the combined resonant circuit to the retrace frequency, each of retrace resonant circuit 27 and the second retrace resonant circuit that includes winding W1 and capacitor $C_{RT}$ is tuned to a frequency that may be lower than the retrace frequency.

Capacitor $C_{RT}$ causes the retrace voltage across winding W1 and that across deflection winding $L_H$ to occur simultaneously. Therefore, retrace voltage $H_r$ across winding W4 that provides synchronization information to Driver and oscillator 50, advantageously, contains the same synchronization information as of the retrace voltage across deflection winding $L_H$ or as of voltage V41 across capacitor $C_{RD}$. The purpose of capacitor $C_{RT}$ is described in detail in the Haferl patent that is incorporated by reference herein.

The values of the capacitors $C_p$, $C_{RD}$ and $C_{RT}$ are selected to obtain the correct retrace time and to avoid retrace time modulation of voltage $V_1$. Capacitor $C_{RT}$ determines the lowest deflection current amplitude that corresponds with current $i_3$ that is zero.

Except for a very short interval that occurs immediately at the beginning of retrace when transistor Q4 is still in saturation, transistor Q4 of E-W control circuit 25 of FIG. 1 operates, during the rest of horizontal retrace interval, as a Class A sink current amplifier. Sink current $i_3$ in transistor Q4 develops a proportional feedback voltage $V_{R4}$ across a resistor $R_4$ that is coupled between the emitter of transistor Q4 and ground. Volta $V_{R4}$ is fed back to the base of a transistor Q3 via a resistor $R_5$. The collector of transistor Q3 is coupled to the base of transistor Q4 at a terminal 25a. The amplitude of sink current $i_3$, during retrace, is kept independent from variations of the shape and amplitude of voltage $V_3$, for example, by the negative feedback arrangement of resistors $R_4$ and $R_5$; therefore, high output impedance at the retrace frequency and above is established at the collector of transistor Q4. The average amplitude of sink current $i_3$ is adjusted by a width control resistor $R_{11}$, which determines the emitter voltage of transistor Q3, in accordance with a vertical parabola voltage $V_{10}$, that is described below. Thus, the average value of current $i_3$ is modulated at a vertical rate in a parabolic manner in accordance with voltage $V_{10}$.

FIGS. 2a-2f and 3a-3e, illustrate waveforms useful in explaining the operation of the arrangement of FIG. 1.

Similar numbers and symbols in FIGS. 1, 2a–2f and 3a–3e indicate similar items or functions.

Parabola voltage $V_{10}$ of FIG. 1 is generated across a capacitor $C_c$ of, for example, a conventional vertical deflection circuit 300. Parabola voltage $V_{10}$ of FIG. 3d is AC coupled to the emitter of transistor $Q_3$ of FIG. 1 via a DC blocking capacitor $C_4$, a resistor $R_{14}$ and an adjustable E-W control resistor $R_{12}$.

Retrace voltage $V_3$ is coupled via a diode $D_3$, a time-integrating network, or lowpass filter that includes a resistor $R_2$ and a capacitor $C_2$ that filters out frequencies above the vertical frequency. The lowpass filtered voltage is coupled, via a resistor $R_3$, to the emitter of transistor $Q_3$. The low frequency negative feedback voltage that develops across capacitor $C_2$ causes the average value of voltage $V_3$ to vary in a vertical rate parabolic manner in accordance with vertical parabola voltage $V_{10}$. Because of the negative feedback, the peak, for example, of the vertical rate envelope of voltage $V_3$ is inversely related to the vertical parabola voltage applied across emitter-base junction of transistor $Q_3$ that is obtained from voltage $V_{10}$. Such low frequency feedback arrangement of resistors $R_2$ and $R_3$ provides DC stabilization and improves linearly.

Figure 3:
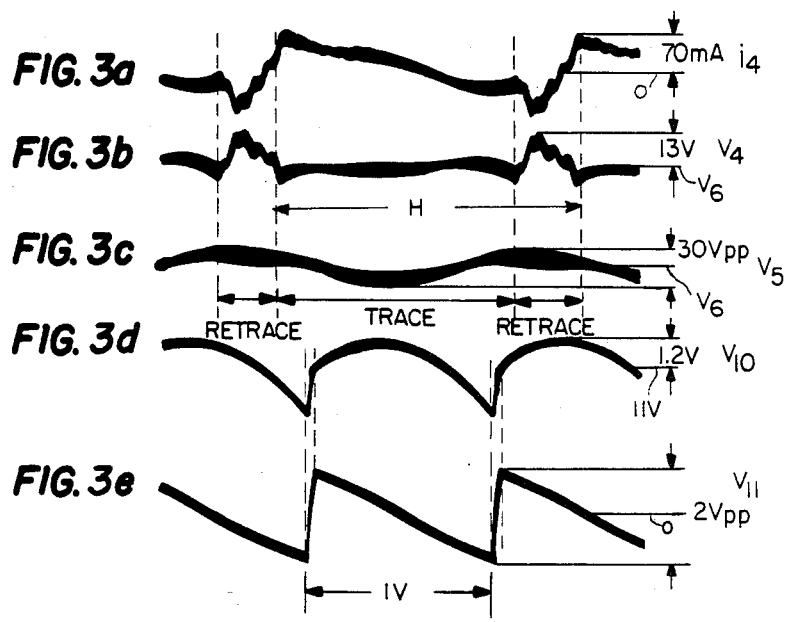
FIGS. 3a–3e illustrate additional waveforms useful in explaining the circuit of FIG. 1.
Figure 4:
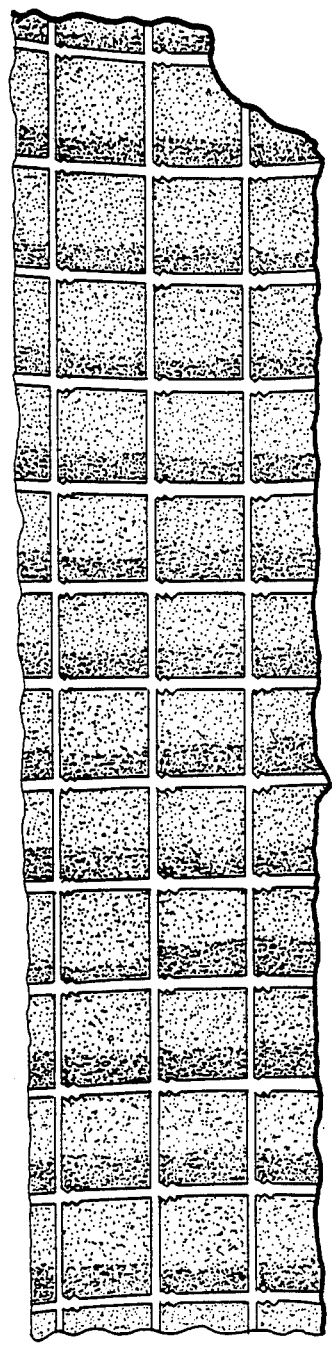
FIG. 4 illustrates a crosshatch pattern in which "mouseteeth" distortion is uncorrected.

Also applied to the base of transistor $Q_3$ is an adjustable portion of a vertical sawtooth voltage $V_{11}$, that provides trapeze correction, shown in FIG. 3e, that is obtained across a resistor $R_s$ of FIG. 1. Resistor $R_s$ is coupled in series with a vertical deflection winding $L_v$ and capacitor $C_c$ of circuit 300.

Correction of inside pincushion distortion is accomplished by the "S"-shaping of deflection current $i_1$, in accordance with an inside pincushion correction modulation current $i_2$ that flows in capacitance $C_6$ and in inductor L1 of inside pincushion distortion correction circuit 60. Current $i_2$, that flows in a current path that includes trace capacitance $C_2$, varies a voltage $V_{cs}$ across trace capacitance $C_s$, during trace, at a frequency that is higher than the trace resonance frequency of the trace resonant circuit that includes deflection winding $L_H$ and trace capacitance $C_s$. The amplitude of current $i_2$ is modulated by voltage $V_3$ of FIG. 2f at terminal 28 of FIG. 1 to provide inside pincushion correction. The higher is the amplitude of current $i_2$, the higher is the peak-to-peak amplitude of trace voltage $V_{cs}$ that is produced and the more significant is the amount of "S"-shaping of deflection current $i_1$ that is provided, and vice versa. Operation of circuit 60 is described in more detail in U.S. Patent Application No. 875,708 entitled RASTER CORRECTION CIRCUIT, in the name of P. E. Haferl, that is incorporated by reference herein.

Capacitance $C_6$ and inductor L1 of circuit 60 form, with trace capacitance $C_s$ and deflection winding $L_H$, a resonance circuit portion of correction circuit 60 during trace. The resonance circuit portion of circuit 60 is tuned by inductor L1 to a frequency that is lower than frequency $f_H$ so that current $i_2$ will not reach zero value prior to the end of horizontal trace; yet, it is tuned to a frequency that is substantially higher than the resonance frequency of the trace resonant circuit of deflection winding $L_H$ and trace capacitance $C_s$. Inside pin modulation inductor L1 may be of a variable type if an adjustable amount of correction is required. For the circuit values shown in FIG. 1, inductor L1 may tune the resonance circuit portion of circuit 60 to a frequency of, for example, 14 KHz.

The portion of voltage $V_{cs}$ that is caused by deflection current $i_1$ is generally a parabola shaped waveform that, in each horizontal period H, is composed of trace and retrace sinewave portions, respectively. During trace, the corresponding sinewave portion of voltage $V_{cs}$ is at a frequency that is approximately equal to the trace resonance frequency of winding $L_H$ and capacitor $C_s$. Such resonance frequency is for example, equal to approximately 7 KHz. During retrace, the corresponding sinewave portion is at approximately 44 KHz.

Inductor L1 and capacitance $C_6$ are included in a circuit branch that, during trace, is coupled in parallel with trace capacitance $C_s$. During the first half of trace, resonance current $i_2$ flows, in a direction opposite to the arrow, from ground, through capacitance $C_6$, inductor L1, capacitance $C_s$, diode $D_1$, deflection transistor Q1 that is conductive and back to ground. During the second half of trace, current $i_2$ circulates in the direction of the arrow, from ground, through diode $D_2$, capacitance $C_s$, indcutor L1 and capacitance $C_6$ and back to ground.

Deflection current $i_1$ flows, during retrace, in a current path that includes retrace capacitor $C_{RD}$, deflection winding $L_H$ and trace capacitor $C_s$. Trace capacitor $C_s$, that provides low impedance during retrace, prevent current $i_1$ from flowing, throughout retrace, in the branch of circuit 60 that includes capacitance $C_6$ and inductor L1. Because inductor L1 is bypassed by capacitor $C_s$, the deflection inductance during retrace and retrace voltage $V_1$ are, advantageously, not substantially affected by inductor L1. Therefore, circuit 100 of FIG. 1 may, advantageously, require a relatively low level of voltage B+ when operating at higher deflection frequencies such as, for example, $2 \times f_H$.

Figure 2:
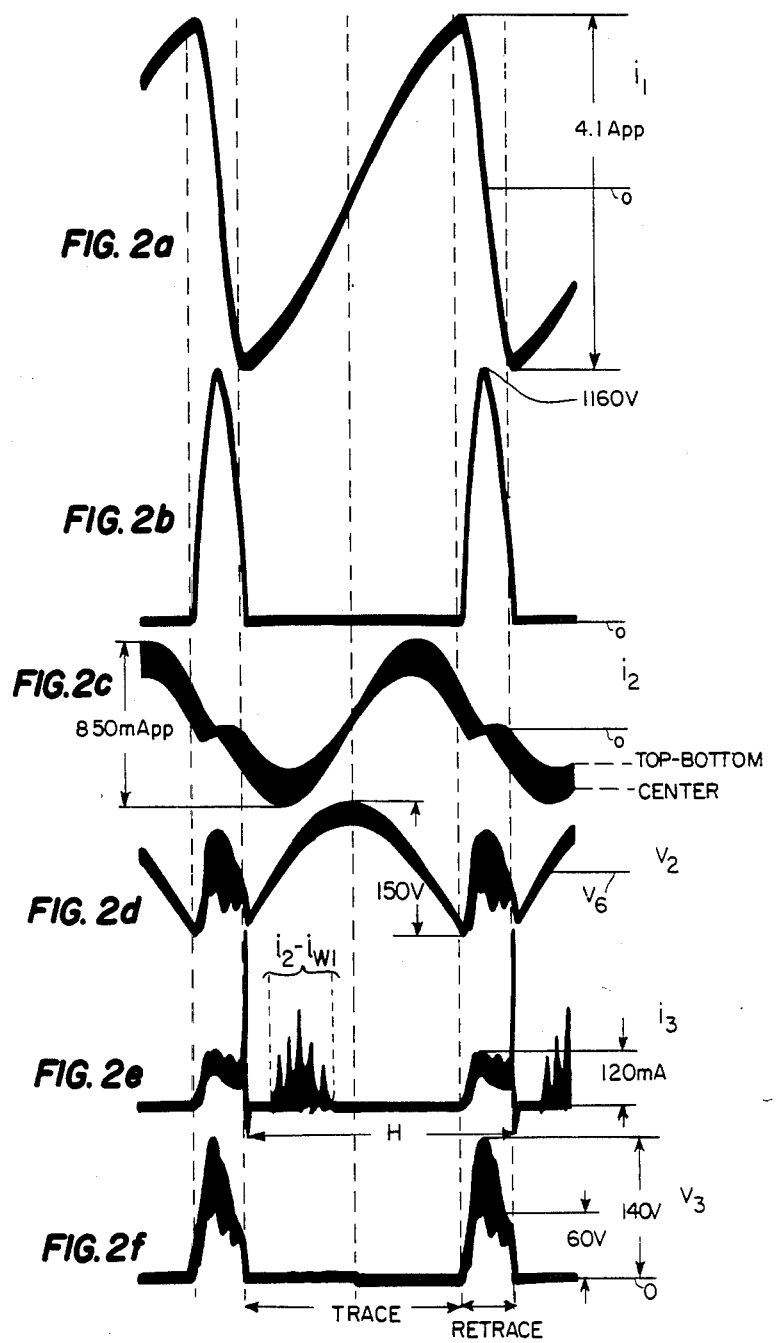
FIGS. 2a–2f illustrate waveforms useful in explaining the circuit of FIG. 1.

During horizontal trace, voltage $V_3$ of FIG. 1 is maintained zero as shown in FIG. 2f. At the center of vertical trace, when current $i_3$ is at a maximum level, horizontal retrace voltage $V_3$ is at minimum that may be for example, at zero volts. Consequently, in this case, it is trace voltage $V_{cs}$ across capacitor $C_s$ that mainly generates resonant current $i_2$. Current $i_2$ of FIG. 2c that flows in capacitor $C_s$ in the same phase as current $i_1$ of FIG. 2a and adds in capacitor $C_s$ to current $i_1$ to provide maximum "S" shaping of voltage $V_{cs}$ when current $i_3$ is at the maximum. As current $i_3$ becomes smaller, during vertical trace, horizontal retrace voltage $V_3$ becomes increasingly larger as shown in the corresponding waveforms in FIG. 1. The phase of voltage $V_3$ is shifted by approximately 180° from that of trace voltage $V_{cs}$, because the positive peak of trace voltage $V_{cs}$ or $V_2$ of FIG. 2d occurs at the center of horizontal trace; whereas the peak of modulated voltage $V_3$ of FIG. 2f occurs during horizontal retrace. Therefore, voltage $V_3$ of FIG. 1, which is added to trace voltage $V_{cs}$ across capacitor $C_S$ to form voltage $V_2$, has an opposite effect on current $i_2$ than that of voltage $V_{cs}$. When retrace voltage $V_3$ increases, current $i_2$ decreases, causing less modulation of trace voltage $V_{cs}$ or $V_2$ and less "S" shaping. A further increase of retrace voltage $V_3$ causes the amplitude of current $i_2$ to be zero. An even further increase of retrace voltage $V_3$ causes current $i_2$ to flow in the opposite direction.

Thus, current $i_2$ of FIG. 2c that modulates voltage $V_2$ of FIG. 2d is modulated by voltage $V_3$ of FIG. 2f. Since voltage $V_3$ is modulated by current $i_3$ of FIG. 2e, the parabolic waveform of trace voltage $V_2$ of FIG. 2d is modulated in the vertical rate by current $i_3$ of FIG. 2e to provide inside pincushion distortion correction.

The correction of outside pincushion distortion requires, at the top and bottom of the raster, a lower amplitude of deflection current $i_1$ of FIG. 2a than at the center. The correction of inside pincushion distortion requires a lower amount of "S" shaping at the top and bottom than at the center. At the top and bottom sink current $i_3$ that is lower, causes a higher amplitude of retrace voltage $V_3$. The higher amplitude of voltage $V_3$ causes a lower amplitude of current $i_2$. At the center of the vertical trace, sink current $i_3$, that is at a maximum causes the amplitude of retrace voltage $V_3$ to be at a minimum. Accordingly, at the center of vertical trace, the amplitude of each of deflection current $i_1$ and inside pincushion correction current $i_2$ is at a maximum, resulting in more "S" shaping of voltage $V_{cs}$. Advantageously, by selecting the values of the circuit components of circuit 60, a required amount of inside pincushion correction can be obtained for a given amount of outside pincushion correction.

Circuit 60 is coupled in parallel with capacitor $C_{RT}$ during the retrace interval. Therefore, the value of capacitor $C_{RT}$ has to be larger than if circuit 60 was not used, so as to account for the effect of circuit 60 on the total retrace capacitance that is required. Increasing the value of capacitor $C_{RT}$ has a tendency to increase the coupling between flyback transformer T1 and resonant circuit 27 that may, if not accounted for, disadvantageously, increase "mouseteeth" distortions.

During the first half of trace, current $i_2$ flows, in a direction that is opposite to that of the arrow, from ground, through capacitor $C_6$, inductance L1, and capacitor $C_S$ to junction terminal 28 between diodes D1 and D2. An energy recovery current $i_{w1}$ flowing through winding W1 of flyback transformer $T_1$ in a direction of the arrow, keeps diode D2 conducting as long as current $i_2$ is smaller than energy recovery current $i_{w1}$ and provides a ground return for current $i_2$. However, diode D2 may become nonconductive when the increasing amplitude of current $i_2$ is equal to the decreasing amplitude of energy recovery current $i_{w1}$ in winding W1. Such situation is undesirable because it may cause the trace voltage at terminal 23 of transistor Q1 to rise significantly above ground potential.

Sink current transistor Q4 is switched into saturation at the beginning of the horizontal trace interval. Advantageously, this provides a current path for inside pincushion modulation current $i_2$ during the first half of the trace interval. Current $i_2$ causes voltage $V_3$, during trace, to increase so as to bias diode D3 in the forward direction. Because transistor Q4 is saturated, diode D3, advantageously, provides a ground return for current $i_2$ via saturated transistor Q4 and clamps voltage $V_3$ to approximately zero volts.

Transistor Q4 is switched into saturation by retrace pulse $H_r$ across winding W4 that is applied to the base of transistor Q3 through a capacitor $C_5$. A waveform shaping network that includes capacitor $C_5$ and resistors $R_{15}$ and $R_{16}$ generates from pulse $H_r$ an upramping voltage $V_7$, during trace that is shown in the corresponding waveform in FIG. 1. The negative portion of voltage $V_7$ is applied to the base of transistor Q3 via a diode D4 and a resistor $R_{17}$ to form a voltage $V_9$ that causes transistors Q3 and Q4 to saturate. The waveform, that is included within FIG. 1, of voltage $V_9$ shows the base voltage of transistor Q3. At a time $t_a$ in the waveform of voltage $V_9$ in FIG. 1, that occurs at the end of retrace, transistors Q3 and Q4 are driven into saturation by negative going voltage $V_9$. Both transistors Q3 and Q4 remain in saturation until a time $t_b$, when diode D4 is reversed biased that is caused by upramping voltage $V_7$. During the interval $t_b - t_a'$, transistor Q4 is biased for Class A operation that occurs during horizontal retrace after time $t_a'$ so as to provide high output impedance.

FIG. 2a illustrates the waveform of retrace voltage $V_1$ at terminal 23 of FIG. 1. Retrace voltage $V_1$ of FIG. 2a is, advantageously, unaffected by modulation of E-W modulation current $i_3$.

In carrying out an aspect of the invention, a resistor R18 that is coupled between terminal 22a and an intermediate terminal, or tap 112 of inductor L1. Resistor R18 supplies a DC current $i_4$ that bypasses deflection winding $L_H$ and winding W1. Current $i_4$ that flows through resistor R18 and inductance L1, advantageously, stabilizes the DC voltage in capacitor $C_S$ by providing an additional DC current path between supply voltage $V_6$ and capacitor $C_S$.

The average DC voltage of voltage $V_2$ at junction terminal 60a of winding $L_H$ and capacitance $C_S$ is equal to voltage $V_6$ that is at terminal 22a between capacitor C1 and resistor R18. Thus, advantageously, by supplying a portion of the DC current that is required for maintaining average voltage $V_{cs}$ constant through resistor R18, in addition to the portion that is supplied through winding W1, transient discharge of capacitor $C_s$ due to varying ultor load is, advantageously, reduced; hence, "mouseteeth" distortion is reduced.

The AC portions of voltages $V_2$ of FIG. 2d and $V_5$ of FIG. 3c at the end terminals of inductor L1 have opposite phases. The location of tap 112 of FIG. 1 is selected in such a way that, advantageously, causes voltage $V_4$ at tap 112 of inductor L1 of FIG. 1, that is approximately equal to the average of voltages $V_2$ and $V_5$, to have a minimal AC component, during trace, as shown in FIG. 3b. Consequently, resistor R18 of FIG. 1, that is coupled to tap 112 does not load deflection circuit 100 and inside pincushion correction circuit 60 significantly and, therefore, advantageously, does not increase AC losses in circuit 100.

In carrying out another aspect of the invention, current $i_4$ of FIG. 3a that flows in resistor R18 of FIG. 1 is sawtooth shaped because of the ripple voltage component of voltage $V_6$. Advantageously, current $i_4$ may correct some of the asymmetrical horizontal linearity errors. Linearity errors occur because of power losses in winding $L_H$ and in inductor L1 during trace that might have caused a slight decrease in voltage $V_4$ at tap 112. The decrease in voltage $V_4$ might have resulted in currents $i_1$ and $i_2$ having smaller amplitudes close to the end of horizontal trace. To correct, at least some of such asymmetrical linearity error, current $i_4$, that is sawtooth shaped, advantageously, reduces the amount of decrease in voltage $V_4$ that might have, otherwise, occurred.

What is claimed:
1. A deflection apparatus, comprising:
   a source of an input signal at a first frequency that is related to a deflection rate;
   a deflection winding for generating scanning current in said deflection winding at said deflection rate during trace and retrace intervals of a deflection cycle, said deflection winding being included in a retrace resonant circuit during said retrace interval;
   switching means coupled to said deflection winding and responsive to said input signal for generating, during said retrace interval a retrace voltage;
   a trace capacitance coupled to said deflection winding to form with said deflection winding a first trace resonant circuit during said trace interval such that said scanning current in said trace capacitance develops a parabolic voltage therein during said trace interval;

a source of supply voltage developed at a supply terminal;

a supply inductance coupled between said source of said supply voltage and said trace capacitance for supplying via said supply inductance a first portion of a DC supply current that replenishes a first portion of energy losses in said retrace resonant circuit; and means coupled to said supply terminal and to another terminal coupled to said trace capacitance for supplying a second portion of said DC supply current to said trace capacitance in a current path that bypasses said supply inductance for replenishing a second portion of said energy losses such that said second portion of said DC supply current is applied without significantly AC-loading said first trace resonant circuit.

2. An apparatus according to claim 1 further comprising, a source of a ripple AC signal at a frequency that is related to said first frequency that is coupled to said another terminal for correcting asymmetrical linearity errors.

3. An apparatus according to claim 1 further comprising a second resonant circuit, including a second capacitance and a modulation inductance coupled to said first resonant circuit for providing inside pincushion distortion.

4. An apparatus according to claim 3 wherein said modulation inductance has a first terminal that is coupled to said trace capacitance and a second terminal that is coupled to said second capacitance to form said second resonant circuit that generates in said modulation inductance a first modulation current that provides inside pincushion distortion correction and wherein said second portion of said supply current is coupled to said modulation inductance intermediate said first and second terminals of said modulation inductance.

5. An apparatus according to claim 4 wherein said trace capacitance acts as a low impedance bypass capacitance for said scanning current around said modulation inductance substantially throughout said retrace interval.

6. An apparatus according to claim 4 wherein corresponding AC voltage components at said first and second terminal of said modulation inductance are phased in such a way so as to substantially reduce an AC voltage component at said third terminal.

7. An apparatus according to claim 4 further comprising, a retrace capacitance coupled to said deflection winding to form a retrace resonant circuit and a source of a second modulation current that is modulated at a vertical rate to provide outside pincushion distortion correction, said second modulation current being coupled to said retrace resonant circuit via a high impedance that isolates said retrace resonant circuit from said supply inductance during said retrace interval.

8. An apparatus according to claim 7 wherein said source of said second modulation current varies said first modulation current in accordance herewith to provide both inside and outside pincushion distortion correcting.

9. An apparatus according to claim 1 wherein said supply terminal and said another terminal are at substantially the same DC voltage but at substantially different AC voltages.

10. A deflection apparatus comprising:

a source of an input signal at a first frequency that is related to a deflection rate;

a deflection winding for generating, at said deflection rate scanning current in said deflection winding during a trace interval and during a retrace interval of a deflection cycle, said deflection winding being included in a retrace resonant circuit during said retrace interval;

switching means coupled to said deflection winding and responsive to said input signal for generating, during said retrace interval, a retrace voltage that generates said scanning current in said deflection winding;

a trace capacitance coupled to said deflection winding to form with said deflection winding a first trace resonant circuit during said trace interval such that said scanning current in said trace capacitance develops during said trace interval a parabolic voltage in said trace capacitance;

a circuit branch, including a second capacitance and a second inductance, said second inductance having a first terminal that is coupled to said trace capacitance and a second terminal that is coupled to said second capacitance to form a second resonant circuit that generates in said second inductance an alternating current that is coupled to said second capacitance to develop a voltage in said second capacitance at a frequency that is related to said deflection rate, said voltages in said first and second terminals being combined at a third terminal of said second inductance for providing a substantial cancellation of an alternating current voltage component that is developed at said third terminal;

a source of supply voltage;

a supply inductance coupled between said source of said supply voltage and said trace capacitance for supplying via said supply inductance a first portion of supply current that replenishes a first portion of energy losses in said retrace resonant circuit; and an impedance coupled between said source of supply voltage and said third terminal of said second inductance for supplying a second portion of said supply current to said trace capacitance through said third terminal that replenishes a second portion of said energy losses such that said second current bypasses said supply inductance.

11. An apparatus according to claim 10 wherein said voltage at said third terminal that is substantially reduced prevents said impedance from loading said trace capacitance.

12. An apparatus according to claim 10 wherein said voltage at said second terminal is substantially sinusoidal.

13. An apparatus according to claim 10 wherein said voltages in said first and second terminals are substantially at opposite phases.

14. An apparatus according to claim 10 wherein said third terminal is coupled in said inductance between said first and second terminals of said inductance.

* * * * *